(12) United States Patent
Boecker et al.

(10) Patent No.: US 8,991,637 B2
(45) Date of Patent: Mar. 31, 2015

(54) MOLDED RESERVOIR SUPPORT STRUCTURE COUPLING

(71) Applicant: TI Automotive Technology Center GmbH, Rastatt (DE)

(72) Inventors: Albert J. Boecker, Ettlingen (DE); Andreas W. Dobmaier, Karlsruhe (DE); Alex Ehler, Rastatt (DE); Patrick Gmuend, Karlsruhe (DE); Peter Grauer, Steinweiler (DE); Gerrit A. Michaelis, Friesenheim (DE); Matthias B. Olbrich, Rastatt (DE)

(73) Assignee: TI Automotive Technology Center GmbH, Rastatt (DE)

( * ) Notice: Subject to any disclaimer, the term of this patent is extended or adjusted under 35 U.S.C. 154(b) by 0 days.

(21) Appl. No.: 14/133,712

(22) Filed: Dec. 19, 2013

(65) Prior Publication Data
US 2014/0197174 A1    Jul. 17, 2014

Related U.S. Application Data

(60) Provisional application No. 61/752,512, filed on Jan. 15, 2013.

(51) Int. Cl.
*B60K 15/067* (2006.01)
*B60K 15/03* (2006.01)
*F16B 2/20* (2006.01)

(52) U.S. Cl.
CPC ......... *B60K 15/067* (2013.01); *B60K 15/03177* (2013.01); *B60K 2015/03032* (2013.01); *B60K 2015/03375* (2013.01); *B60K 2015/03453* (2013.01); *B60K 2015/03493* (2013.01); *F16B 2/20* (2013.01); *Y10T 403/648* (2015.01)
USPC ........................... 220/562; 220/653; 220/651

(58) Field of Classification Search
USPC ......... 220/562, 653, 301, 651, 652, 563, 564, 220/302
See application file for complete search history.

(56) References Cited

U.S. PATENT DOCUMENTS

| | | | | |
|---|---|---|---|---|
| 3,913,783 A | * | 10/1975 | Cooper | 220/300 |
| 4,960,153 A | * | 10/1990 | Bergsma | 137/587 |
| 7,146,730 B2 | | 12/2006 | Bergsma et al. | |
| 7,290,675 B2 | | 11/2007 | Gombert et al. | |
| 2009/0206097 A1 | * | 8/2009 | Gebert et al. | 220/653 |
| 2009/0324866 A1 | | 12/2009 | Bocker et al. | |
| 2011/0068109 A1 | | 3/2011 | Boecker et al. | |
| 2011/0140314 A1 | | 6/2011 | Grauer | |
| 2012/0024868 A1 | * | 2/2012 | Menke | 220/653 |

* cited by examiner

*Primary Examiner* — Stephen Castellano
(74) *Attorney, Agent, or Firm* — Reising Ethington P.C.

(57) ABSTRACT

A molded reservoir support structure coupling may include an anchor and a support structure. The anchor may have one or more first flange(s) projecting generally laterally from a sidewall of the anchor. The support structure may have one or more second flange(s) projecting generally laterally therefrom. When interconnected, surface-to-surface confrontation between the first flange(s) and the second flange(s) inhibits longitudinal separation of the anchor and the support structure.

25 Claims, 3 Drawing Sheets

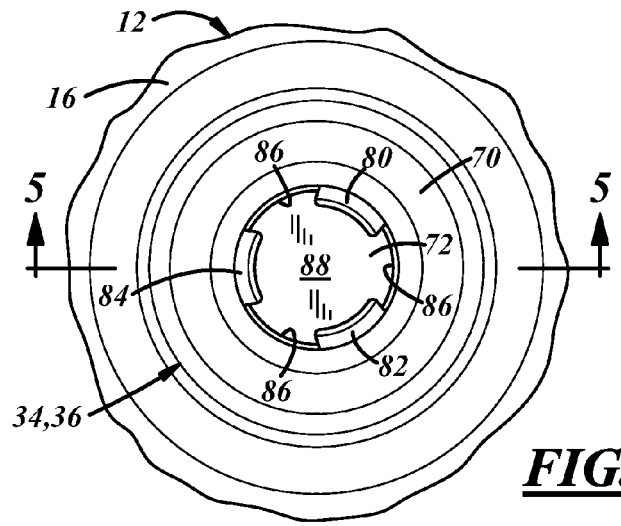
FIG. 4
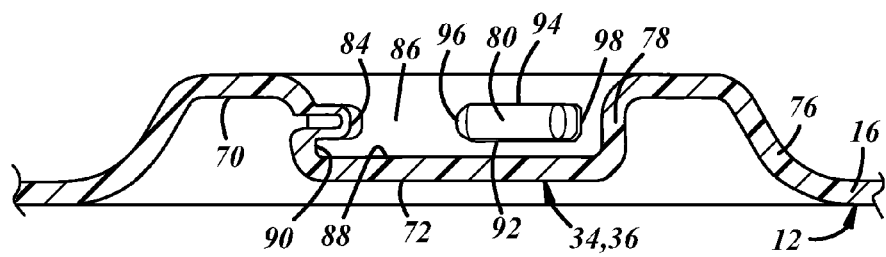
FIG. 5
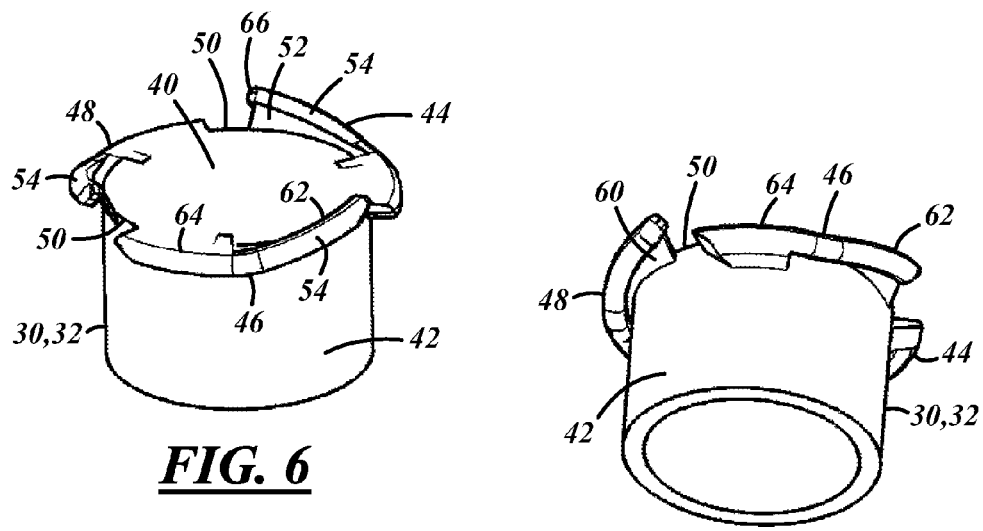
FIG. 6
FIG. 7

MOLDED RESERVOIR SUPPORT
STRUCTURE COUPLING

REFERENCE TO CO-PENDING APPLICATION

This application claims the benefit of U.S. Provisional Patent Application Ser. No. 61/752,512, filed Jan. 15, 2013, which is incorporated herein by reference in its entirety.

TECHNICAL FIELD

The present disclosure relates generally to molded reservoirs, and more particularly to couplings between the molded reservoirs and support structures.

BACKGROUND

Certain containers or reservoirs can hold liquids and inflammable materials. For example, fuel tanks hold fuel for vehicle fuel systems, such as automotive fuel systems. The fuel is eventually supplied to a prime mover like an internal combustion engine. In addition to holding fuel, fuel tanks commonly house components within their interiors such as pumps, valves, and the like.

SUMMARY

In at least some implementations, a molded reservoir support structure coupling may include an anchor and a support structure. The anchor is carried by the molded reservoir and has a side wall with at least one first flange projecting generally laterally from the side wall. The support structure is formed separately from the anchor and has at least one second flange projecting generally laterally therefrom and adapted to be overlapped by the first flange to inhibit longitudinal separation of the anchor and the support structure. In at least some implementations, the support structure may be provided in a position where the flanges do not overlap and are later moved to a position where they do overlap. This may be accomplished, for example, by relative rotation between the support structure and the anchor.

In at least some implementations, a fuel tank may include a fuel tank wall at least partly defining an interior for holding fuel and having at least a first flange at the interior that projects generally laterally from a first portion of the fuel tank wall. The fuel tank wall may have at least a second flange at the interior that projects generally laterally from a second portion of the fuel tank wall. A support structure may brace the first and second portions of the fuel tank wall and have a first end with at least a third flange that projects generally laterally, and a second end with at least a fourth flange that projects generally laterally. In assembly, the first flange and the third flange are laterally and longitudinally overlapped, and the second flange and the fourth flange are laterally and longitudinally overlapped to inhibit disconnection of the support structure from the fuel tank wall.

A molded reservoir support structure coupling may include an anchor and a support structure. The anchor may have one or more first flanges that may project generally laterally from a side wall of the anchor. The support structure may have one or more second flanges that may project generally laterally therefrom. To interconnect the anchor and the support structure, the anchor and support structure may be brought together in a longitudinal direction and an end of the one or more second flanges may advance past an end of the one or more first flanges. Further, the anchor, the support structure, or both, may be rotated and the one or more first flanges and the one or more second flanges may lap over each other and surface-to-surface confrontation between the flanges may inhibit longitudinal separation of the anchor and the support structure.

A fuel tank may include a fuel tank wall and a support structure. The fuel tank wall may partly or more define an interior for holding fuel, and may have one or more first flanges and one or more second flanges. The one or more first flanges may project generally laterally from a first portion of the fuel tank wall. The one or more second flanges may project generally laterally from a second portion of the fuel tank wall. The one or more first flanges may have a first top surface, and the one or more second flanges may have a second top surface. The support structure may brace the first portion and the second portion of the fuel tank wall. The support structure may have a first end and a second end. The first end may have one or more third flanges that may project generally laterally at or near the first end, and the second end may have one or more fourth flanges that may project generally laterally at or near the second end. The one or more third flanges may have a first bottom surface, and the one or a more fourth flanges may have a second bottom surface. To interconnect the fuel tank wall and the support structure, the one or more first flanges and the one or more third flanges may be brought together longitudinally adjacent each other, and the one or more second flanges and the one or more fourth flanges may be brought together longitudinally adjacent each other. The fuel tank wall, the support structure, or both, may be rotated and the first top surface of the one or more first flanges may be brought to confront the first bottom surface of the one or more third flanges, and the second top surface of the one or more second flanges may be brought to confront the second bottom surface of the one or more fourth flanges. And the confrontation of the respective top and bottom surfaces may inhibit disconnection of the fuel tank wall and the support structure.

A fuel tank may include a fuel tank wall and a support structure. The fuel tank wall may partly or more define an interior for holding fuel. The fuel tank wall may have an anchor with a side wall. The fuel tank wall may have one or more first flanges that may project generally laterally from the side wall. And the fuel tank wall may have one or more clearances located at the side wall and adjacent the one or more first flanges. The support structure may be constructed to brace the fuel tank wall. The support structure may have one or more second flanges that may project generally laterally therefrom. The one or more first flanges, the one or more second flanges, or both, may have a raised portion. And the one or more first flanges, the one or more second flanges, or both, that is free of and does not have the raised portion may have a segmented annular portion. To interconnect the fuel tank wall and the support structure, the support structure may be inserted into the anchor and the one or more second flanges may pass through the one or more clearances. The fuel tank wall, the support structure, or both, may be rotated and the one or more first flanges and the one or more second flanges may lap over each other.

BRIEF DESCRIPTION OF THE DRAWINGS

The following detailed description of preferred embodiments and best mode will be set forth with reference to the accompanying drawings, in which:

FIG. 4 is a fragmentary top view of part of the fuel tank support structure coupling of FIG. 3;

FIG. 5 is a sectional view of the part of FIG. 4 taken generally along line 5-5 in FIG. 4;

FIG. 6 is a perspective view of an embodiment of another part of the fuel tank support structure coupling of FIG. 3;

FIG. 7 is another perspective view of the part of FIG. 6;

DETAILED DESCRIPTION OF PREFERRED EMBODIMENTS

Referring in more detail to the drawings, a support structure coupling 10 can be used in a molded reservoir such as a vehicle fuel tank 12 like a low pressure automotive fuel tank that is part of a larger automotive fuel system. The support structure coupling 10 provides an effective mechanical interlock between the fuel tank 12 and a support structure 14 that braces one or more walls of the fuel tank. As will be described in greater detail below, anchors of the support structure coupling 10 can be formed in a wall 16 of the fuel tank 12 during an associated molding process that forms the fuel tank, and the support structure 14 can be subsequently coupled to the anchors once the molding process is complete. Although described in the context of an automotive fuel system and tank, the support structure coupling 10 could be equipped and used in other applications such as boat applications, recreational vehicle applications, as well as others. As an aside, the terms axial, radial, and circumferential as used herein refer to directions relative to the generally circular and cylindrical shapes of the respective components of the support structure coupling 10, such that axially refers to a direction along an axis of the components, radially refers to a direction along a radius of the components, and circumferentially refers to a direction along a circumference of the components; these terms would also apply even if the components of the support structure coupling are not generally circular and cylindrical in shape, as they need not be.

Figure 1:
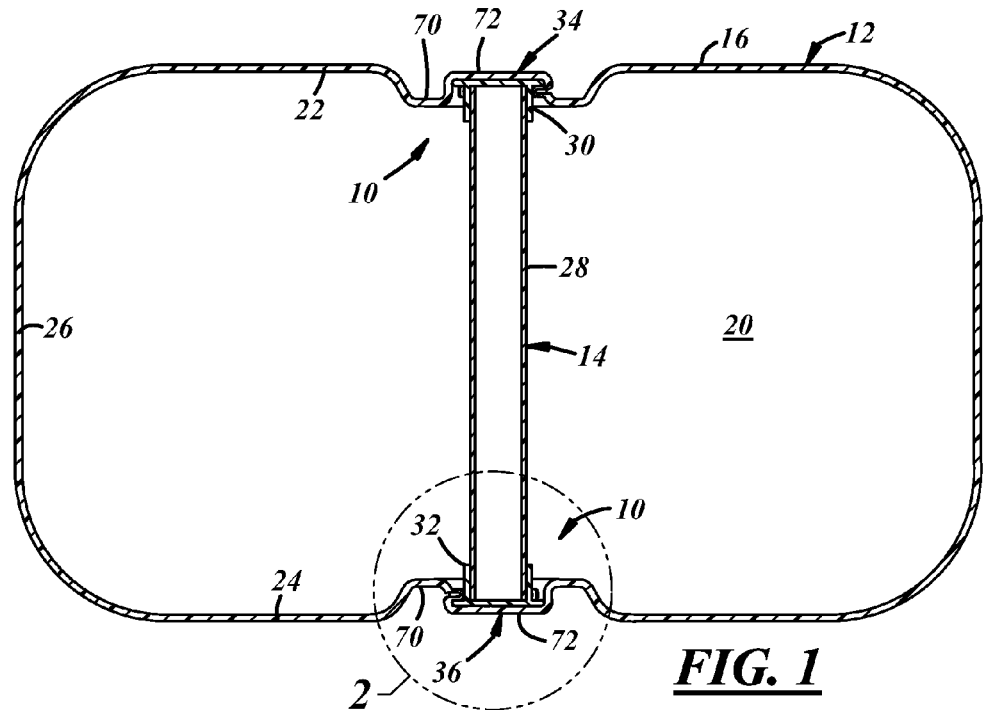
FIG. 1 is a sectional view of an embodiment of a fuel tank, showing an embodiment of a support structure and a coupling therebetween.

Referring to FIG. 1, the fuel tank 12 has one or more walls 16 and a body that define an interior 20 in which liquid fuel is held. The wall 16 includes a top wall portion 22, a bottom wall portion 24, and a side wall portion 26 extending between the top and bottom wall portions. In other embodiments not shown in the figures, the shape and geometry of the fuel tank 12 could be more complex than that shown in FIG. 1, and can include stepped top and bottom wall portions and different interior compartments. As will be known by skilled artisans, the fuel tank 12 can be composed of a multi-layer plastic material such as a high density polyethylene (HDPE) layer, an ethylene vinyl alcohol (EVOH) layer, adhesive layers, or other and different layers, or can be composed of a single layer material. The fuel tank 12 can be manufactured by a blow molding process or via another process.

Still referring to FIG. 1, the support structure 14 extends between and makes contact with one or more of the wall portions of the fuel tank 12 in order to brace the wall portions and ultimately bolster the structural integrity of the fuel tank wall 16. In this embodiment, the support structure 14 braces the top and bottom wall portions 22, 24. And although not shown, the support structure 14 could carry components housed within the interior 20 of the fuel tank 12 including valves, a fuel level sender, or other components. In the embodiment of FIG. 1, the support structure 14 is in the form of a post or beam, but could take other forms including columns, cross-members, or internal baffles. The beam has a beam body 28, a first or top end 30, and a second or bottom end 32.

The support structure coupling 10 can have different designs, constructions, and components depending upon—among other considerations—the design and construction of the fuel tank 12 and the design and construction of the support structure 14. In the embodiment of the figures, the support structure coupling 10 includes parts of the support structure 14 and parts of the fuel tank wall 16. The first and second ends 30, 32 of the support structure 14 are part of the support structure coupling 10, as well as a first anchor 34 and a second anchor 36 of the fuel tank wall 16.

The first and second ends 30, 32 can be a unitary and one-piece extension of the beam body 28, or can be a discrete component attached to the beam body via a mechanical connection, a force-fit, heat-staking, fusing, or another attachment technique. The first and second ends 30, 32 can have different designs and constructions depending upon, among other considerations, the design and construction of the first and second anchors 34, 36. In the embodiment of FIGS. 6-12, the first and second ends 30, 32 each have a closed top wall 40 and a side wall 42 extending from the top wall. In other embodiments, the top wall need not be closed and instead could be open or have another construction. The ends 30, 32 may have a generally annular and cylindrical shape, and may be composed of plastic material such a glass-fiber reinforced HDPE, another plastic material, or a metal material.

Figure 3:
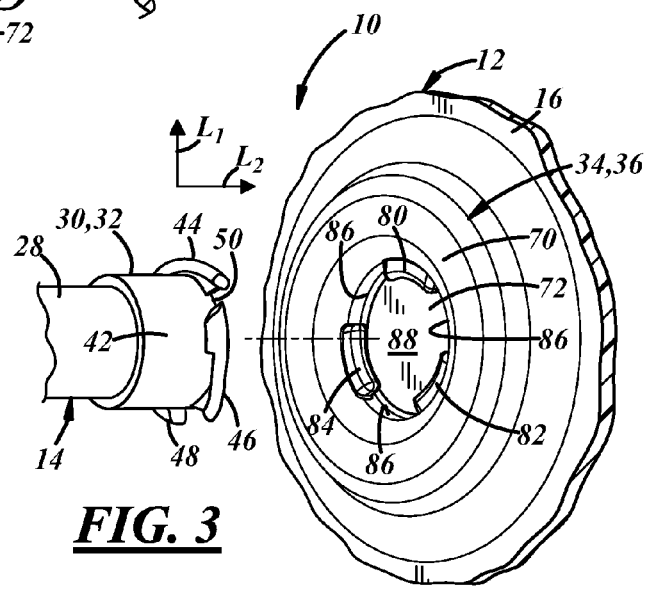
FIG. 3 is an exploded view of an embodiment of a fuel tank support structure coupling that can be used with the fuel tank and the support structure of FIG. 1.

For interconnection with the first and second anchors 34, 36, each of the first and second ends 30, 32 may have one or more connection features. In the embodiment shown, the connection features are constituted by a first flange 44, a second flange 46, and a third flange 48. In other embodiments not shown, a single flange or more or less than three flanges could be provided. As shown in FIGS. 6-12, the flanges 44, 46, 48 are spaced apart from one another by way of gaps 50 located generally around the circumferential periphery of the side wall 42. The flanges 44, 46, 48 project laterally (in this example, radially-outwardly) from the top wall 40, and in a sense are radial extensions of the top wall in this embodiment. In other embodiments, the flanges need not project from the top wall and instead could project from the side wall axially spaced from the top wall, or could project from both the side and top walls. As used herein, the terms lateral and laterally refer to directions that are generally orthogonal to a direction in which the ends 30, 32 and the anchors 34, 36 are initially brought together before rotation, as described in greater detail below. In the example of FIG. 3, the lateral direction is denoted by arrow $L_1$; in this case, the lateral direction also happens to be the radial direction. Further, the flanges 44, 46, 48 project laterally beyond the side wall 42, and they project longitudinally (in this example, axially-outboard) above the top wall 40. As used herein, the terms longitudinal and longitudinally refer to directions that are generally parallel to the direction in which the ends 30, 32 and the anchors 34, 36 are initially brought together before rotation, as described in greater detail below. In the example of FIG. 3, the longitudinal direction is denoted by arrow $L_2$; in this case, the longitudinal direction also happens to be the axial direction.

Figure 8:
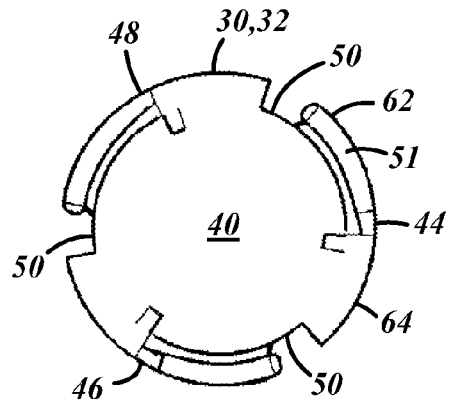
FIG. 8 is a top view of the part of FIG. 6.
Figure 9:
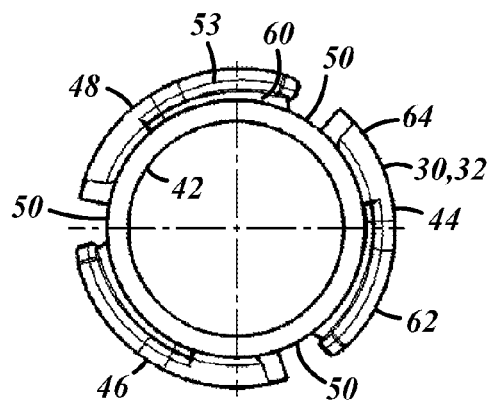
FIG. 9 is a bottom view of the part of FIG. 6.
Figure 10:
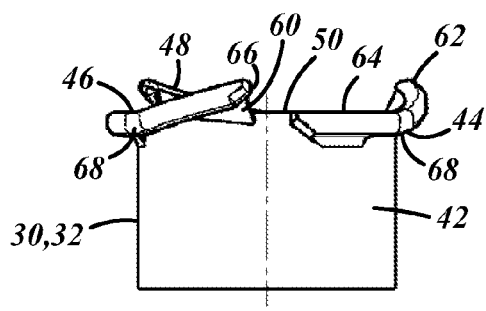
FIG. 10 is a side view of the part of FIG. 6.
Figure 11:
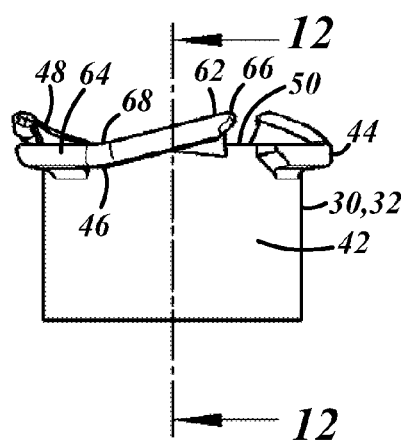
FIG. 11 is another side view of the part of FIG. 6, the part in this side view is rotated from its position shown in FIG. 10.
Figure 12:
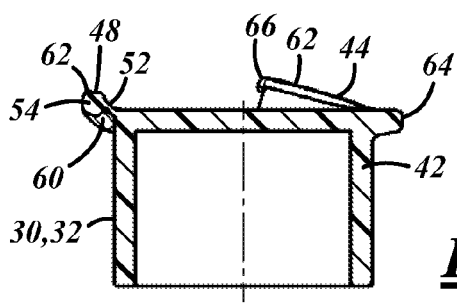
FIG. 12 is a sectional view of the part of FIG. 6, taken generally along line 12-12 in FIG. 11.

Still referring to FIGS. 6-12, each individual flange 44, 46, 48 has a top surface 51 and a bottom surface 53 (shown in FIGS. 8 and 9 respectively). Each flange 44, 46, 48 also can have a connection web or stem 52 extending from the side wall 42 at the top wall 40, and can have a lip 54 extending from the stem. As shown best in the sectional profile of FIG. 12, the stem 52 is a thin-walled section of the respective flange, while the lip 54 has a generally circular sectional profile. Underneath each of the flanges 44, 46 48—and between the side wall 42, the stem 52, and the lip 54—an undercut or furrow 60 can be defined. The furrow 60 can be generally circumferentially co-extensive with the thin-walled section of each of the flanges 44, 46, 48.

Furthermore, each individual flange 44, 46, 48 has a raised or longitudinally-inclined portion in the form of a helically-extending portion 62, and has an unraised circumferentially-extending portion 64. In other embodiments, the inclined portion could be provided in another form such as a stepped portion or a curved portion. The helically-extending portion 62 eases initial interconnection with the complementary parts of the first and second anchors 34, 36, and generally traces a segmented helix. The portion 62 provides a ramping or camming action that can initially draw the support structure and anchor together upon rotation. In the FIGS. 6-12, the portion 62 is shown in a first or unflexed state in which the stem 52 is not stressed and is at rest, and the portion is generally in position to receive a complementary feature of the anchors when they are initially brought together. Upon complete interconnection between the support structure ends 30, 32 and the anchors 34, 36, the portion 62 is urged to a second or flexed state in which the portion is bent about the stem 52 and is displaced in the longitudinal direction to an unraised position substantially in-line with the portion 64 and with the top wall 40. In this embodiment, the stem 52 merely yields to the urging but does not break or fracture when it is bent to the second state. Furthermore, as shown best in FIGS. 10 and 11, an apex of the portion 62 constitutes a leading end 66 thereof. And a trailing end 68—longitudinally declined relative to the leading end—spans to the circumferentially-extending portion 64.

The circumferentially-extending portion 64, in contrast to the helically-extending portion 62, traces a circumference of the side wall 42 without otherwise deviating in the longitudinal direction. Also, unlike the portion 62, the circumferentially extending portion 64 extends from the side wall 42 via a thicker extension than the stem 52 and does not substantially bend during interconnection. Though shown as unitary with each other, the portions 62, 64 could be separated from each other by gaps in other embodiments. And still in other embodiments not shown in the figures, the support structure need not have interconnecting structures at both ends, and instead could have interconnecting structures like the flanges at one end, with another end having another structure meant to simply bear against the fuel tank wall, bear against another component, or simply remain suspended within the interior of the fuel tank.

Referring now to FIGS. 2-5, the first and second anchors 34, 36 are formed as one-piece unitary portions of the fuel tank wall 16. Here, the first anchor 34 is located in the top wall portion 22, and the second anchor 36 is located in the bottom wall portion 24. The first and second anchors 34, 36 can have different designs and constructions depending upon, among other considerations, the design and construction of the first and second ends 30, 32. In the embodiment of FIGS. 3-5, each of the first and second anchors 34, 36 includes a first depression 70 and a second depression 72 formed in the fuel tank wall 16. In other embodiments not shown in the figures, a pair of depressions need not be used for the anchors, and instead simply a single depression alone could be used. The first and second depressions 70, 72 are generally circular and are concentric with respect to each other, with the first depression located laterally outside of the second depression, and the second depression, in turn, located laterally inside of the first depression. Referring in particular to FIG. 5, the first depression 70 makes a longitudinally-inboard protrusion when viewed from the interior 20 of the fuel tank 12. And, conversely, the second depression 72 makes a longitudinally-outboard protrusion when viewed from an exterior of the fuel tank 12. Here, the terms inboard and outboard are used with respect to the interior 20, whereby inboard refers to direction toward the interior and outboard refers to a direction away from the interior. By their shape, the first and second depressions 70, 72 form a first side wall 76 and a second side wall 78.

For interconnection with the first and second ends 30, 32, the second depression 72 of each of the first and second anchors 34, 36 may have one or more connection features. In the embodiment shown, the connection features are constituted by a first flange 80, a second flange 82, and a third flange 84. In other embodiments not shown, a single flange or more or less than three flanges could be provided; this may or may not depend on the number of flanges provided for the interconnecting support structure. In this embodiment, the flanges 80, 82, 84 are in the form of lugs, and therefore will be subsequently referred to as lugs. Still referring to FIGS. 3-5, the lugs 80, 82, 84 are spaced apart from one another via clearances 86 located generally around the circumferential periphery of the second side wall 78. The lugs 80, 82, 84 project laterally (in this example, radially-inwardly too) from the second side wall 78. Further, the lugs 80, 82, 84 are spaced longitudinally-inboard from an inner surface 88 of the fuel tank wall 16 and of the second depression 72, and define slots 90 therebetween. Each individual lug 80, 82, 84 has a top surface 92 and a bottom surface 94 (top and bottom are not necessarily with reference to the figures). Each lug 80, 82, 84 has a curved, arcuate or segmented annular shape and generally traces a circumference of the second side wall 78 from a first circumferential end 96 to a second circumferential end 98, without otherwise deviating in the longitudinal and axial directions. In other embodiments not shown in the figures, the lugs could be longitudinally-inclined.

As mentioned, the first and second anchors 34, 36, and thus the lugs 80, 82, 84, can be formed during a molding process of the fuel tank 12. In one example, the lugs 80, 82, 84 can be formed into the fuel tank wall 16 by a molding process that is modified but still somewhat similar to the blow molding process described in U.S. Patent Application Publication No. 2011/0140314, entitled Component Mounting Arrangement and assigned to TI Automotive Technology Center GmbH. Here, in the modification, three tool arms (also called sliders)—one for each of the three lugs—are advanced and working ends thereof engage a still partially molten and pliable fuel tank wall material (in this embodiment, the wall material is that of the second side wall 78). The pliable wall material is displaced laterally inwardly to form the segmented annular shapes of the lugs 80, 82, 84. The inwardly displaced wall material is permitted to cool and harden, and the working ends of the tool arms are retracted, leaving the finally-formed lugs 80, 82, 84. The first and second depressions 70, 72 can also be formed during the molding process of the fuel tank 12. In one example, the depressions 70, 72 can be formed by way of a complementarily-shaped forming surface of a blow molding die.

To interconnect the fuel tank 12 and the support structure 14, the support structure is inserted into one of the anchors and the two are twisted together so that their connection features are interlocked together and keep the support structure and fuel tank together. Initially, the ends 30, 32 can be brought adjacent respective anchors 34, 36. This process can be performed after the molding process of the fuel tank 12 is complete and without other more involved processes. While the more involved processes may be suitable and even preferred in some instances, they can involve molding a reservoir around a support structure assembly amid the accompanying blow molding process, or can involve separating severed halves of a reservoir and placing them around a support structure assembly. The support structure assembly 10 as described herein, in contrast, merely can use an opening in an already-molded fuel tank 12 for insertion of the support structure 14 and for insertion of one or more of the ends 30, 32 with one or more of the anchors 34, 36.

Taking one end and one anchor for exemplary purposes, the first end 30 is longitudinally advanced toward the first anchor 34 for inserting the first end into the first anchor. Before or during its advancement, the first end 30 is turned to a first position in which the leading end 66 of each flange 44, 46, 48 is circumferentially and angularly aligned with a corresponding clearance 86 of the first anchor 34. As longitudinal advancement proceeds, the leading ends 66 pass through the clearances 86 between the circumferential ends 96, 98 of neighboring lugs. The top surfaces 51 of the flanges 44, 46, 48, and particularly of the helically-extending portion 62, can come into close confrontation or even make contact with the inner surface 88 of the first anchor 34 once the first end 30 is fully advanced into the first anchor. The helically-extending portion 62 is in its first and unflexed state at this point in the interconnection.

Figure 2:
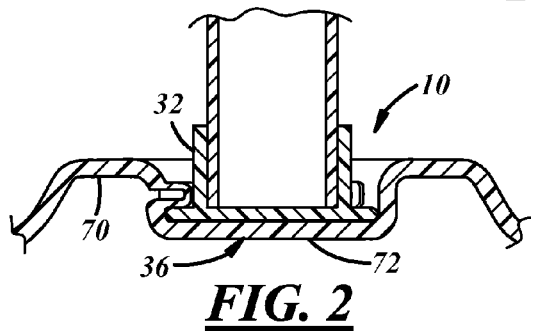
FIG. 2 is an enlarged view taken generally at phantom-circle 2 in FIG. 1.

From the first position, one or both of the fuel tank 12 and the support structure 14 can be circumferentially rotated and turned to a second position in order to interconnect and interlock the fuel tank and support structure against disconnection and longitudinal separation. In the second position, the flanges 44, 46, 48 radially overlap the lugs 80, 82, 84 so that the top surface 51 of the portions 62, 64 closely confronts or makes contact with the inner surface 88, and the bottom surface 53 of the portions 62, 64 closely confronts or makes contact with the top surface 92. The helically-extending portions 62 are moved into the slots 90 and, as turning continues, the helically-extending portions are urged to their second and flexed state by abutment against the inner surface 88 of the fuel tank wall 16. The circumferentially-extending portions 64 are hence also moved into the slots 90 and trapped between the lugs 80, 82, 84 and the fuel tank wall 16 once the portions 62 are in the second state. The flanges 44, 46, 48 and lugs 80, 82, 84 can come together to the second position in a somewhat tight and force-fit manner to help keep them together without much slack between the support structure 14 and fuel tank 12. In the second position, and with the portions 62 in their second and flexed state, the portions 62 exert a force against the inner surface 88 of the fuel tank wall 16 and thereby help maintain a taut condition in the support structure coupling 10. Once fully in the second position as shown in FIG. 2, the bottom surfaces 53 of the flanges 44, 46, 48 can confront and make contact with the top surfaces 92 of the lugs 80, 82, 84—this confrontation and contact can be between the helically-extending portions 62 and the lugs, and between the circumferentially-extending portions 64 and the lugs. The confrontation and contact inhibits and prevents disconnection of the fuel tank 12 and the support structure 14.

In other embodiments not shown in the figures, the support structure coupling 10 could have different designs, constructions, and components. For example, the flanges of the support structure could have a segmented annular shape without a raised portion, while the lugs of the anchors could have a raised portion in the form of a helically-extending portion. In another example, the flanges of both of the support structure and the anchors could have helically-extending portions. In yet another example, the flanges of the support structure could project laterally and radially-inwardly, while the lugs of the anchors could project laterally and radially-outwardly; in this example, the ends of the support structure would have a female construction (as opposed to the male construction in the embodiment of the figures), and the anchors could project from a depression that is formed in the longitudinally-inboard direction.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A molded reservoir support structure coupling, comprising:
    an anchor carried by the molded reservoir and having a depression opening to the interior of the molded reservoir and with an end wall and a side wall with at least one first flange projecting generally laterally from the side wall and generally longitudinally spaced from and lapping a portion of the end wall; and
    a support structure formed separately from the anchor and having an end constructed to be received in the depression and bear on the end wall and at least one second flange projecting generally laterally therefrom and constructed to be received in the depression and overlapped by the first flange to inhibit longitudinal separation of the anchor and the support structure.

2. The molded reservoir support structure coupling of claim 1, wherein the support structure is movable relative to the anchor between a first position wherein the first flange and second flange are not overlapped and a second position wherein the first flange and second flange are overlapped.

3. The molded reservoir support structure coupling of claim 2 wherein the support structure is rotated relative to the anchor to overlap the first flange and the second flange.

4. The molded reservoir support structure coupling of claim 1, wherein the anchor includes an outside depression and an inside depression generally concentric with the outside depression, and the side wall and the end wall at least partly defining the inside depression.

5. The molded reservoir support structure coupling of claim 4, wherein the at least one first flange projects laterally-inwardly from the side wall of the inside depression.

6. The molded reservoir support structure coupling of claim 1, wherein said at least one first flange includes three individual first flanges spaced apart from one another around the extent of the side wall, and said at least one second flange includes three individual second flanges spaced apart from one another around the extent of the support structure and each arranged to be overlapped by at least one first flange.

7. The molded reservoir support structure coupling of claim 1, wherein said at least one first flange, said at least one second flange, or both, have a generally helically-extending portion that facilitates lapping therebetween.

8. The molded reservoir support structure coupling of claim 1, wherein said at least one first flange has a generally curved shape, said at least one second flange has a generally helically-extending portion, said at least one first flange has a top surface and said at least one second flange has a bottom surface, and the top and bottom surfaces confront each other upon lapping of said at least one first flange and said at least one second flange.

9. The molded reservoir support structure coupling of claim 1, wherein said at least one second flange has a raised portion depending from the support structure via a stem and, upon rotation, the raised portion bends about the stem and is displaced toward an unraised position, and said at least one second flange is urged toward said at least one first flange by the bending when the anchor and the support structure are fully interconnected.

10. The molded reservoir support structure coupling of claim 1, wherein the end of the support structure has a top wall and has a side wall extending from the top wall, said at least one second flange projects generally laterally from the top wall and laterally beyond the side wall of the support structure, said at least one second flange has a portion projecting longitudinally above the top wall, and the projecting portion of said at least one second flange lapping over said at least one first flange upon rotation.

11. The molded reservoir support structure coupling of claim 1, wherein the anchor is integrally formed from the same piece of plastic material as the molded reservoir such that the anchor is a portion of a plastic wall of the molded reservoir.

12. The molded reservoir support structure coupling of claim 1 further comprising:
the molded reservoir having a reservoir wall of a plastic material with the depression in the reservoir wall and having at least two of the first flanges circumferentially spaced apart and each projecting generally laterally inward from the side wall and overlapping and longitudinally spaced from a portion of the end wall; and
the separate support structure having at least two of the second flanges circumferentially spaced-apart and projecting generally laterally from the support structure and each overlapped with an associated one of the first flanges to attach the support structure to the reservoir wall.

13. The molded reservoir support structure coupling of claim 12 wherein the support is rotatable relative to the reservoir wall of the reservoir to overlap the first and associated second flanges.

14. The molded reservoir support structure coupling of claim 12 wherein at least one of the first flanges or at least one of the second flanges or both have a generally helically extending portion that facilitates overlapping of the first and second flanges.

15. The molded reservoir support structure coupling of claim 12 wherein at least two of the first flanges each have a generally curved and circumferentially extending free end and the end of the support has a generally circular portion to be received between the curved free ends of the first flanges to facilitate rotation of the support to overlap the first and second flanges.

16. The molded reservoir support structure coupling of claim 12 wherein at least two of the second flanges each have a raised portion extending from the support via a stem and upon rotation of the support the raised portion bends about the stem and is displaced toward an unraised portion when the first and second flanges are overlapped.

17. A fuel tank, comprising:
a fuel tank wall at least partly defining an interior for holding fuel and having at least a first flange at the interior that projects generally laterally from a first portion of the fuel tank wall, the fuel tank wall having at least a second flange at the interior that projects generally laterally from a second portion of the fuel tank wall;
a support structure bracing the first and second portions of the fuel tank wall and having a first end with at least a third flange that projects generally laterally, and a second end with at least a fourth flange that projects generally laterally, wherein the first flange and the third flange are laterally and longitudinally overlapped, and the second flange and the fourth flange are laterally and longitudinally overlapped to inhibit disconnection of the support structure from the fuel tank wall; and
the support structure and its third and fourth flanges are arranged so that the third and fourth flanges may axially pass the first and second flanges and so that rotation of the support structure will overlap the first and second flanges as well as the third and fourth flanges.

18. The fuel tank of claim 17, wherein the fuel tank wall includes a first anchor located at the first portion and a second anchor located at the second portion, and the first flange projects generally laterally from the first anchor and the second flange projects generally laterally from the second anchor.

19. The fuel tank of claim 17, wherein the first flange projects generally laterally-inwardly from the first portion and the second flange projects generally laterally-inwardly from the second portion.

20. The fuel tank of claim 17, wherein the first flange, the second flange, the third flange, the fourth flange, or a combination thereof, have a generally helically-extending portion to facilitate rotation relative to the fuel tank wall.

21. The fuel tank of claim 20, wherein the first flange, the second flange, the third flange, the fourth flange, or a combination thereof, that is free of the helically-extending portion has a curved portion structurally complementing the helically-extending portion to facilitate rotation thereamong.

22. The fuel tank of claim 17, wherein the first end of the support structure has a first top wall and a first side wall extending from the first top wall, the second end of the support structure has a second top wall and a second side wall extending from the second top wall, the third flange projects generally laterally from the first top wall and laterally beyond the first side wall and has a first portion projecting longitudinally above the first top wall, and the fourth flange projects generally laterally from the second top wall and laterally beyond the second side wall and has a second portion projecting longitudinally above the second top wall.

23. A fuel tank, comprising:
a fuel tank wall at least partly defining an interior for holding fuel, having an anchor with a side wall, having at least one first flange projecting generally laterally from the side wall, and having at least one clearance located at the side wall adjacent the first flange; and
a support structure constructed to brace the fuel tank wall and having at least one second flange projecting generally laterally therefrom;
wherein the first flange, the second flange, or both, have a raised portion, and the first flange, the second flange, or both, that is free of the raised portion has a curved portion;
wherein, to interconnect the fuel tank wall and the support structure, the support structure is inserted into the anchor and the second flange passes through the clearance, and the fuel tank wall, the support structure, or both, are rotated and the raised portion and curved portion are initially lapped about each other, and upon further rotation, the raised portion is bent toward an unraised position and the first flange and the second flange lap over each other.

24. The fuel tank of claim 23, wherein the raised portion is a helically-extending portion.

25. The fuel tank of claim 23, wherein said at least one second flange has the raised portion, and, upon further rotation, the raised portion is bent toward the unraised position via abutment against the fuel tank wall.

* * * * *